United States Patent [19]

Sugihara

[11] 4,151,553
[45] Apr. 24, 1979

[54] COLOR TELEVISION CAMERA

[75] Inventor: Yasumasa Sugihara, Kawasaki, Japan

[73] Assignee: The General Corporation, Japan

[21] Appl. No.: 843,146

[22] Filed: Oct. 17, 1977

Related U.S. Application Data

[63] Continuation-in-part of Ser. No. 588,718, Jun. 20, 1975, Pat. No. 4,054,915.

[51] Int. Cl.² .............................................. H04N 9/07
[52] U.S. Cl. ........................................ 358/44; 358/48
[58] Field of Search .................... 358/44, 41, 48, 43

[56] References Cited

U.S. PATENT DOCUMENTS 2,908,835 10/1959 Weimer ............................. 358/48 X
3,860,956 1/1975 Kubo et al. ............................. 358/48

Primary Examiner—Richard Murray
Attorney, Agent, or Firm—Robert E. Burns; Emmanuel J. Lobato; Bruce L. Adams

[57] ABSTRACT

A color television camera including an image sensor comprising a photosensitive array of photoelements arranged in a matrix, an image focussed onto the surface of the array causing a photon produced charge to be stored in selected photoelements, a signal from respective elements being read out to output means in the form of a packet of charge. Each of the photoelements is made to be sensitive to light of only one color component even though the assembly of the photoelements are sensitive to light having more than one color components, the charge stored in a selected number of rows of the array being read out sequentially within each row and simultaneously for the selected number of rows during a sequential horizontal scanning line period.

4 Claims, 32 Drawing Figures

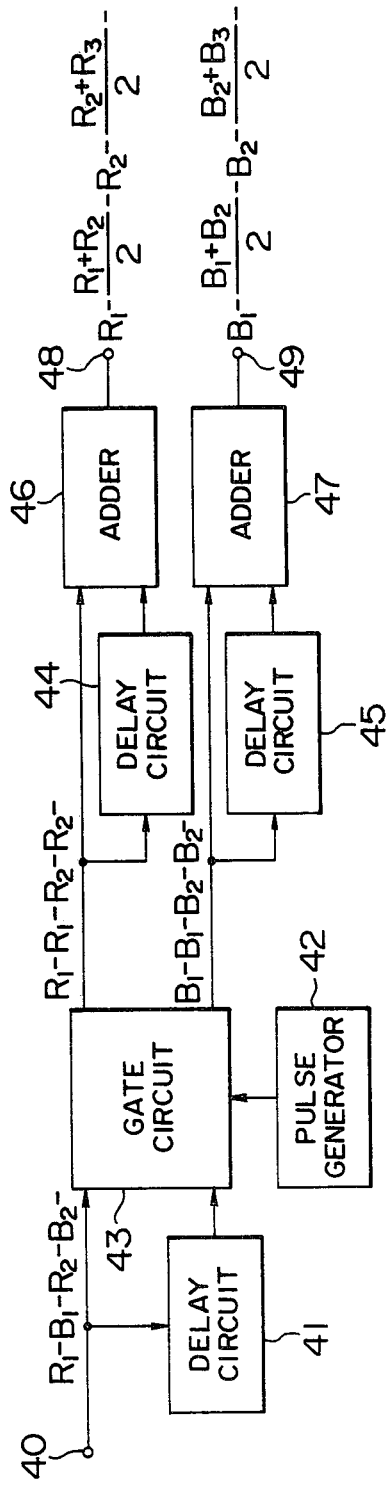
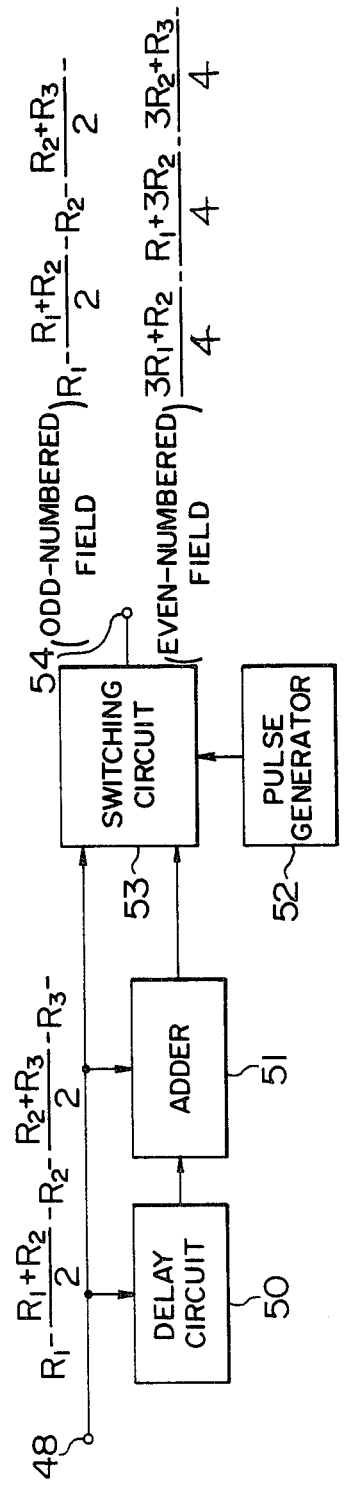

COLOR TELEVISION CAMERA

This is a continuation-in-part of application Ser. No. 588,718, filed June 20, 1975, now U.S. Pat. No. 4,054,915.

The invention relates to a television camera, and more particularly to a color television camera employing a solid state image sensor.

A conventional color television camera includes a single or three pickup tubes, on the photocathode of which is focussed an image which is continuously scanned in both horizontal and vertical directions by a single electron beam in order to derive a video signal. The geometrical distortion of the resulting image is substantially determined by the linearity with which the electron beam scans. Where a plurality of pickup tubes are used, the respective electron beams must be synchronized in time and aligned in geometrical position, which require a high level of skill. With a color television camera including three pickup tubes, an image information is separated into three color components by means of dichroic mirrors before it is converted into three color components. In this instance, the registration between the colors presents a significant problem. With a color television camera employing a pair of pickup tubes, one of the tubes is used for the brightness signal while the other is used for the color signals. For example, a stripe filter is used to derive red and blue signals, while the green signal is derived from the brightness signal and the red and blue signals by means of a matrix circuit. With a color television camera employing a single pickup tube, a complex stripe filter is used to derive the brightness signal and the color signals. It is well known that the color signals can be derived by the use of a strip filter according to a phase or frequency separation technique incorporating a 1H delay circuit, where H represents the period of a horizontal scanning frequency. In a single tube color camera incorporating a stripe filter, the problem of the registration is avoided even though there may be problems associated with the image quality and interference patterns and moire resulting from the use of stripe filter. A stripe filter often comprises a combination of vertical or oblique stripes. A stripe filter comprising horizontal stripes has been proposed, but has not been practically embodied because of the technical difficulty of reliably scanning the electron beam along a thin horizontal stripe.

On the other hand, in the field of a black-and-white television camera, the use of a solid state image sensor utilizing the semiconductor technology such as a recently developed charge-coupled device (CCD) or charge transfer device in place of a pickup tube has been proposed. Such solid state image sensor or a black-and-white television camera using it are described in detail in "Imaging With Charge Transfer Devices", Session 2 of 1974 IEEE Intercon Technical Papers. Briefly, taking CCD which is one type of the solid state image sensor, it comprises a plurality of MOS (metal-oxide film-semiconductor) capacitors comprising semiconductor depletion layers which are arranged in a regular array of rows and columns. An image is optically focussed onto the photoelements of the surface to cause the individual depletion layers to store electric charge which depends on the intensity of incident light thereon. The charge is sequentially transferred by a set of externally applied clock pulses or driving pulses having the same period, thereby reading out the image information as a video signal. Representing the time required for the stored charge to be transferred from one depletion layer to another by the clock pulse by tc, it will be appreciated that tc is equal to the period of the clock pulse. Thus, the transfer time tc can be chosen arbitrarily by changing the frequency of the clock pulse. Assuming that a horizontal row includes N electrodes for the respective depletion layers contained therein, it is seen that the time $T_D$ required to read out the chargers of the row by transfer is given by:

$$T_D = N \times tc$$

The value of N and tc can be chosen so that $T_D$ becomes equal to one horizontal scanning period of the standard television system, and the various parameters can be chosen such that the completion of transfer of one horizontal row is followed by the transfer of charge along a vertically adjacent next horizontal row so that the transfer in the vertical direction is completed within a period of time which is equal to one vertical scanning period of the standard television system, thus enabling such solid state image sensor to be utilized in place of a conventional pickup tube. As a matter of practice, the determination of N, tc and other parameters must take into consideration the retrace time of the horizontal and vertical scanning lines. Such a solid state image sensor has a number of advantages including its compactness, light weight, low power dissipation and high reliability. Another significant feature as compared with a conventional pickup tube is its extremely small geometrical distortion of the image, as will be appreciated from its arrangement and principle of operation.

Therefore, it is an object of the invention to provide a novel color television camera which replaces a pickup tube by a solid state image sensor and which eliminates the above disadvantages found in the conventional color television camera.

It is another object of the invention to provide a circuit arrangement which improves the image quality in a television camera incorporating an image sensor.

In accordance with the invention, each photoelements which constitute the solid state image sensor are given a selective sensitivity to respond to light of a single color even though the entire photoelements are sensitive to light of more than one colors. The photoelement which selects a required color for the color television is arrayed according to a predetermined pattern, and a precise clock pulse is used to effect the transfer according to a predetermined rule to provide a required color television signal. If required, the signal may be processed by an external electrical circuit.

The individual photoelements can be given an inherent color selectivity in a number of ways. In a first technique, the surface of a photoelement which is to have a red color sensitivity is applied with a paint which transmits only the light having the wavelength of a red color, as by evaporation or baking. Similarly, a paint which transmits only the light having the wavelength of a blue color is applied to the surface of the photoelement which is to have a blue color sensitivity, by the similar technique. In this manner, a particular color component of an image is made incident on a selected photoelement to cause a storage of electric charge in its semiconductor depletion layer. In an alternative technique, a color filter is prepared having the same pattern as that of the color selectivity which is previously allotted to the individual photoelements in the plane of the image sensor, and is located in front of the latter. An object to be photographed is focussed onto the filter through a taking lens, and the image which transmitted through the filter is focussed onto the surface of the photoelements of the image sensor through a relay lens. By coordinating the image sensor, relay lens and color filter previously, the photoelements can be given the color selectivity in the designed color array, thereby enabling a required color television signal to be derived. With the solid state image sensor, a color camera incorporating a color filter having horizontal stripes can be readily embodied, even though the achievement of such color camera has been considered as involving a technical difficulty in the case of a pickup tube because of the non-linearity resulting from the deflection of the electron beam.

As with the pickup tubes, the color television camera according to the invention may include one, two, three or four solid state image sensors. However, the present invention is principally effective when less than three image sensors are used. With a color television camera including a single image sensor, a dot filter or stripe filter is used to derive a wide band three color signals from the image sensor. With a color television camera including two solid state image sensors, one image sensor is used for the brightness signal or the broad band green signal while the other image sensor is used for the remaining color signals. As is well recognized, the color television systems which are prevailing currently adopt the mixed highs scheme, so that the color signal has a narrow band, while the brightness signal is a wide band. By way of example, in the NTSC system, the brightness signal has a wide band width of approximately 4.2 MHz while a narrow band width of approximately 0.5 MHz is sufficient for the color signal. Thus, when an image sensor having 400 elements in a row and 500 elements in a column is used for the brightness signal, an array having 50 elements in a row and 500 elements in a column will be sufficient for practical purposes in order to derive the color signal. Since the resolution of the color signal may be made poorer than that of the brightness signal in the vertical direction also, the sensor for the color signal may have a reduced number of elements in a column such as 250 or 125 elements. Where 250 elements are provided in a column, the same photoelements may be used for the odd- and even-numbered fields. With 125 elements in a column, the same photoelements are used for both odd- and even-numbered fields and 1H delay circuit is used to cause the color signal from one row to correspond to a pair of horizontal scanning lines, which will be useful in manufacturing a color television camera inexpensively.

Within the solid state image sensor, individual photoelements are arranged in a regular array. Thus, a design can be employed in which their electrodes are divided into two or three groups according to a preselected rule so that separate clock pulse may be applied to each group to cause a read-out of the charge therein. In accordance with the invention, it is contemplated that two sets of clock pulses be applied to two groups or three sets of clock pulses be applied to three groups simultaneously to perform a transfer of the charge, thereby deriving two or three trains of simultaneous signals. At this end, a dot filter or stripe filter can be used to divide the photoelements of a single image sensor into two groups corresponding to red and blue colors, the group for the red color being joined together so as to permit a transfer of the charge with a single set of clock pulses. Similarly, the group for the blue color is also joined together to permit a transfer of the charge by another set of clock pulses. By effecting a transfer for the red and blue colors simultaneously, it is possible to derive red and blue signals simultaneously. If desired, the respective sets of clock pulses can be adjusted so as to provide a given time interval between the transfer of the respective groups. Such ability of dividing a single image field into more than one groups so as to derive separate signals with a fixed time relationship therebetween has not been achievable with the conventional pickup tube system. By utilizing such feature, the invention provides a simple, inexpensive and high quality system of taking pictures with a color television camera.

As mentioned previously, since the solid state image sensor comprises a regular array of finely divided photoelements arranged in rows and columns, from which the charge stored in the depletion layers are regularly transferred by means of clock pulses which have an accurate time definition, the linearity and the geometrical distortion of the image can be highly improved as compared with that obtained by the use of the pickup tube. The nonlinearity or geometrical distortion of an image in the solid state image sensor is attributable to the misalignment in the array of the photoelements and to the optical lens system used in taking pictures, but either of which is negligibly small as compared with those of the pickup tube. Since the linearity and geometrical distortion in the solid state image sensor are determined uniquely by the geometrical arrangement of the photoelements and the optical lens system, the invention enables a color camera having little color missregistration or a color camera which is compact, light weight and simple in arrangement and circuit to be produced.

The above and other objects, features and advantages of the invention will be better understood from the following description of embodiments thereof with reference to the attached drawings, in which.

Figure 4:
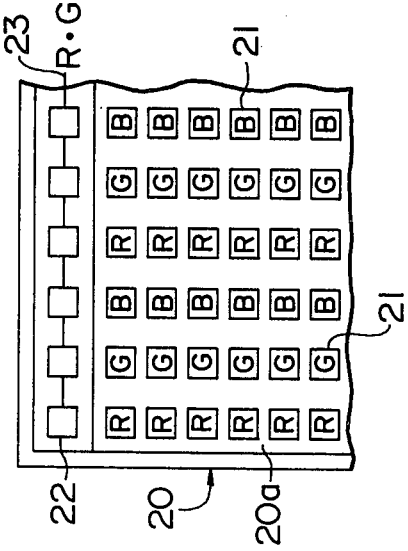
FIG. 4 is a similar view to FIG. 3, but illustrating the array of photoelements in a line sequential system.
Figure 5:
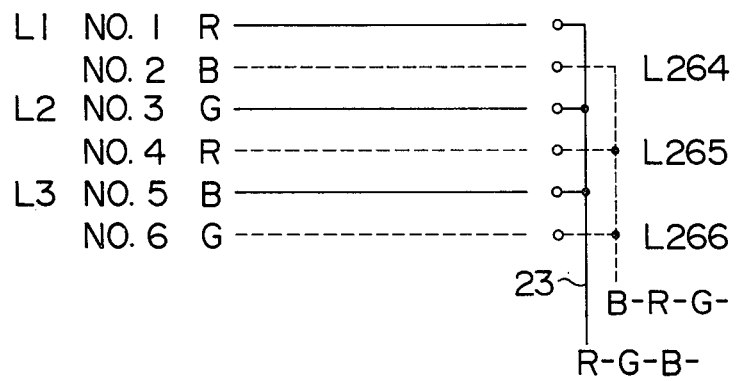
Figure 6:
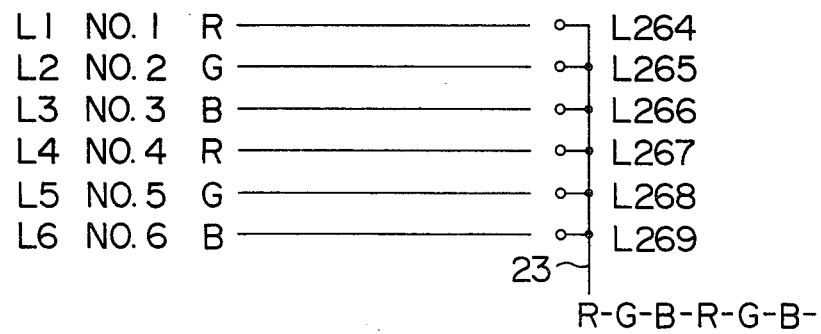
Figure 7:
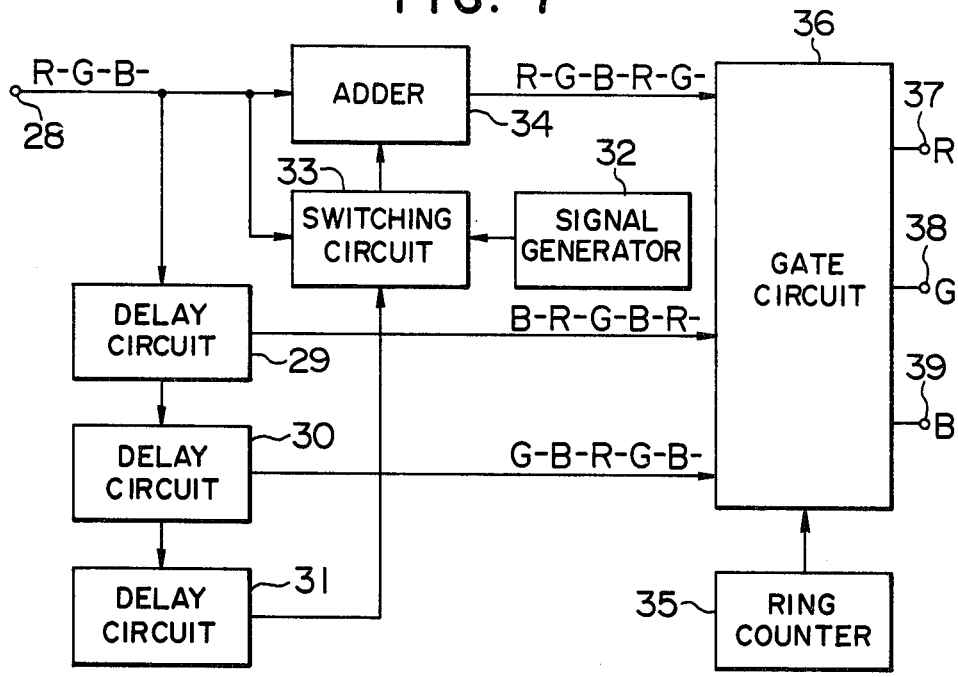
Figure 8:
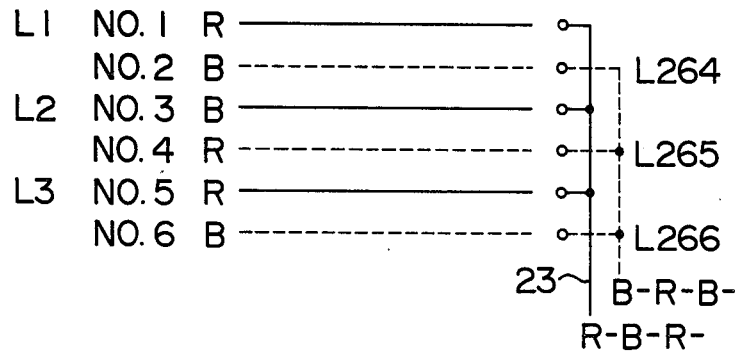
Figure 9:
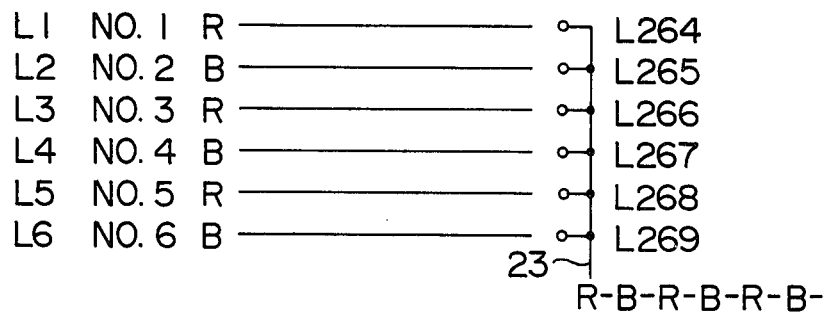
Figure 12:
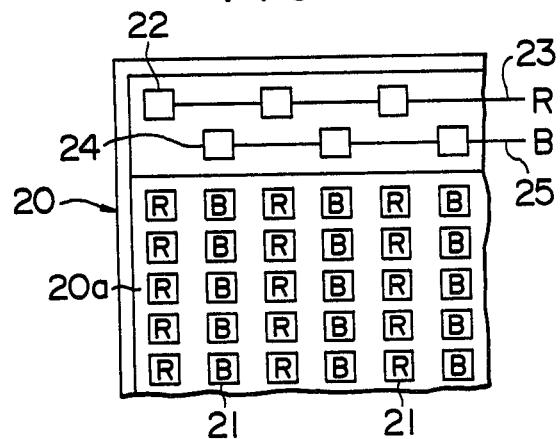
Figure 13:
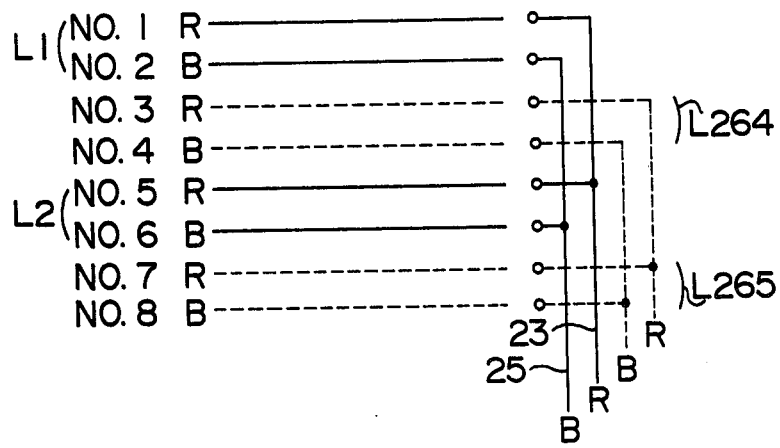
Figure 14:
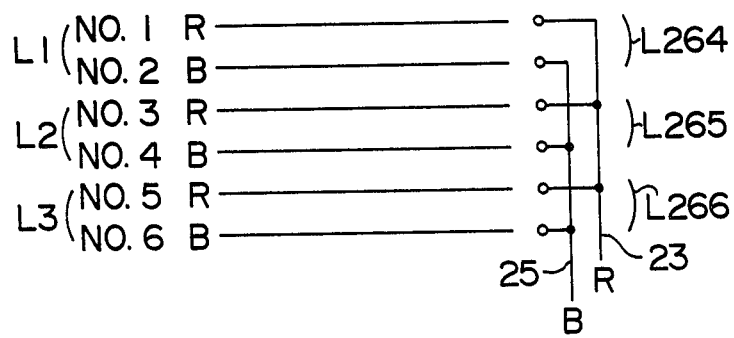
Figure 15:
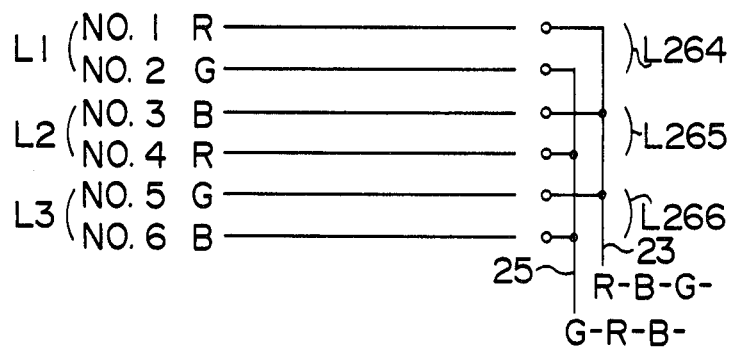
Figure 16:
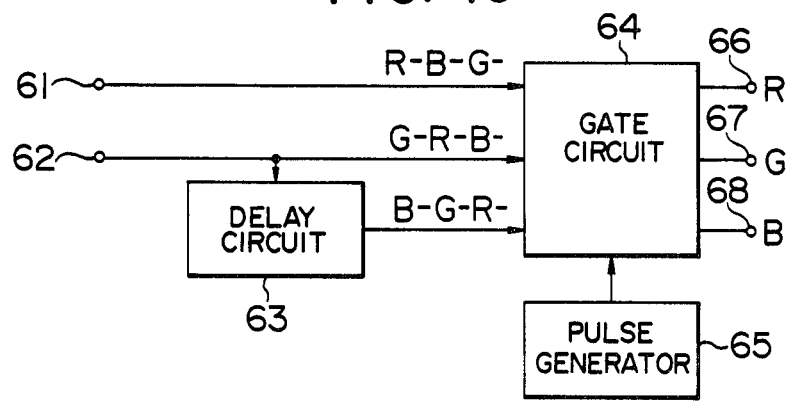
Figure 17:
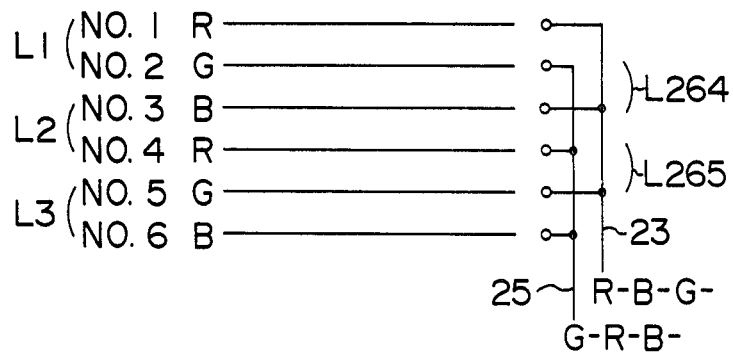
Figure 18:
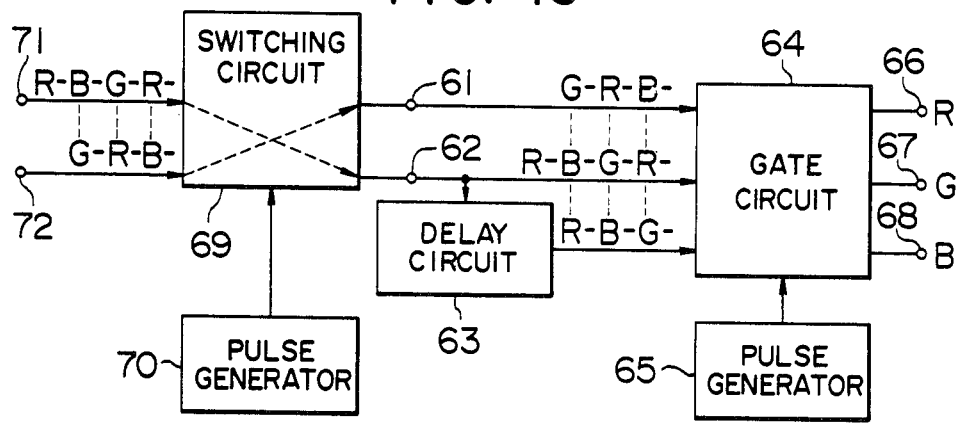
Figure 19:
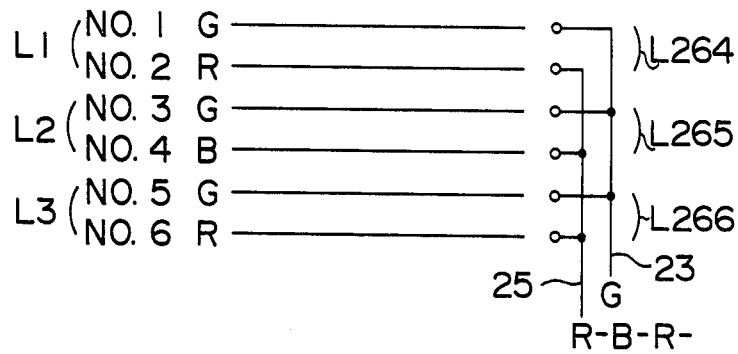
Figure 20:
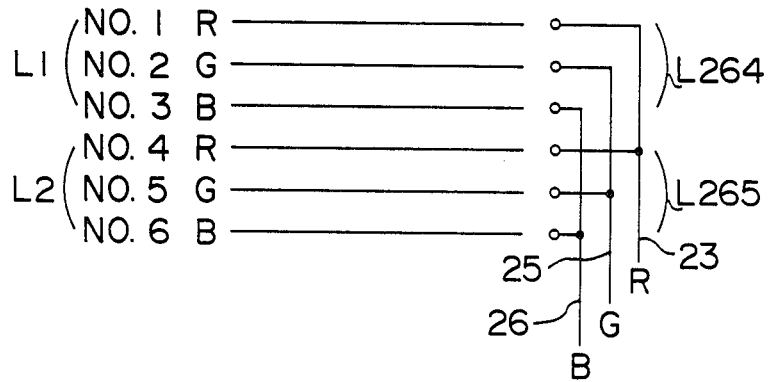
Figure 21:
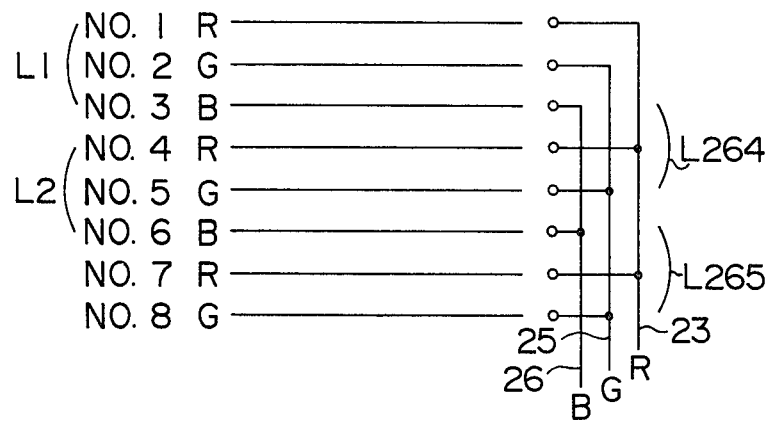
Figure 22:
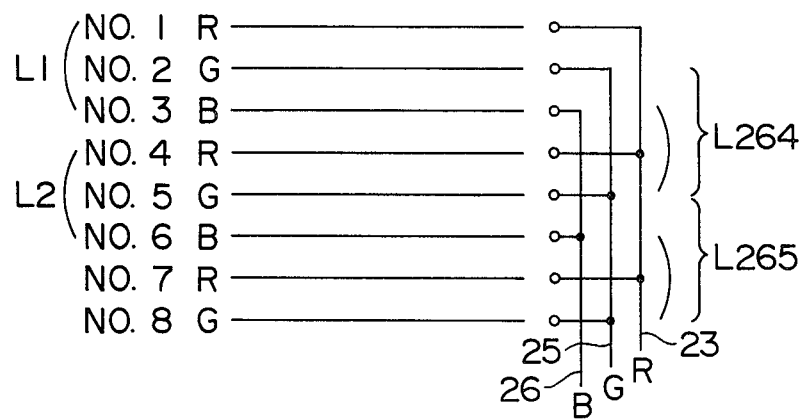
Figure 23:
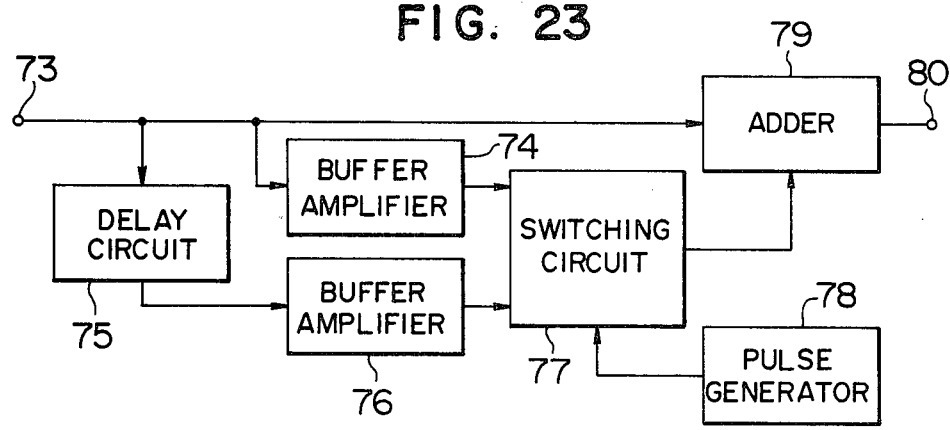
Figure 24:
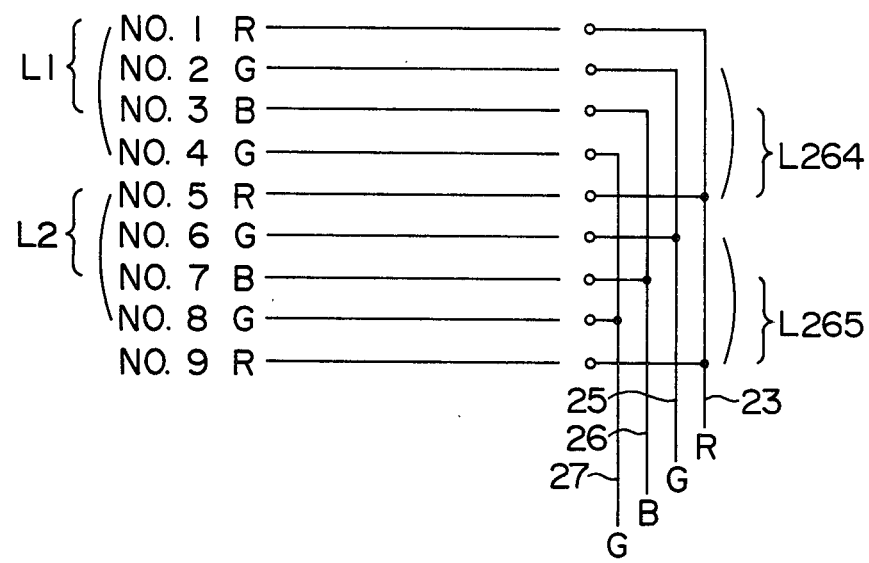
Figure 25:
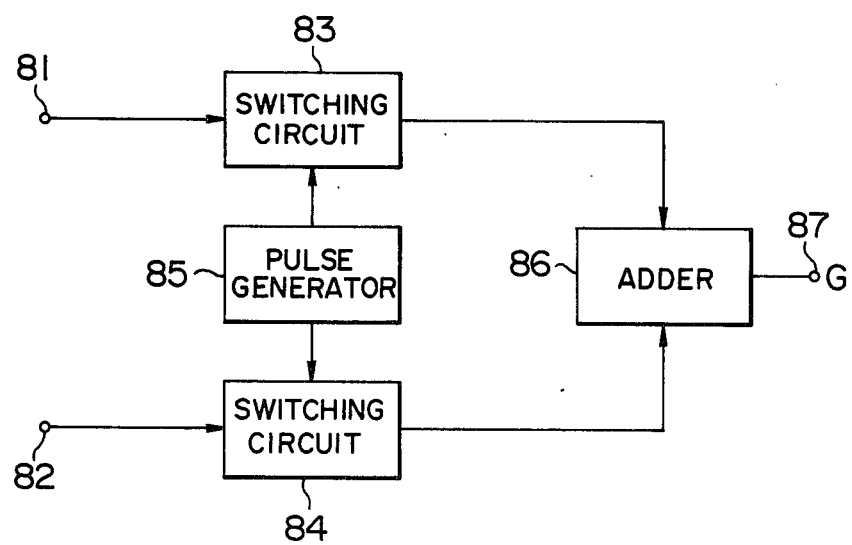

FIG. 5 is a schematic illustration of part of FIG. 4 in which one odd-numbered horizontal row of photoelements shown in FIG. 4 is represented by a single solid line and one even-numbered row of photoelements is represented by a single broken line, illustrating that the solid line corresponds to each scanning line of an odd-numbered field and a broken line corresponds to each scanning line of an even-numbered field;

FIG. 6 is a schematic illustration of an embodiment which is similar to that shown in FIG. 5 except that each horizontal row of photoelements is represented by a single solid line and corresponds to each scanning line of an odd- and an even-numbered field;

FIG. 7 is a block diagram of a circuit for improving the interlaced scanning effect for the color television camera incorporating an image sensor having an array of photoelements as shown in FIG. 6;

FIGS. 8 and 9 are schematic views showing modifications of the arrangement shown in FIGS. 5 and 6, respectively;

FIG. 10 is a block diagram of a signal compensation circuit which is used when an image sensor having an array of photoelements as indicated in FIG. 8 or 9 is employed;

FIG. 11 is a block diagram of a circuit for improving the interlaced scanning effect which can be used in addition to the signal compensation circuit shown in FIG. 10;

FIG. 12 is a schematic view of a novel array of photoelements of an image sensor when the teaching of the invention is applied to a color television camera of dot sequential system;

FIGS. 13 and 14 are schematic views of the novel array of photoelements of an image sensor, in a manner similar to that of FIGS. 5 and 6, when the teaching of the invention is applied to a color television camera of line sequential system;

FIG. 15 is a schematic view showing a modification of FIG. 14;

FIG. 16 is a block diagram of a signal conversion circuit which is connected with the output of the image sensor having an array of photoelements as indicated in FIG. 15;

FIG. 17 is a schematic view showing a modification of FIG. 15;

FIG. 18 is a block diagram of a signal conversion circuit which is connected with the output of an image sensor having the array of photoelements as indicated in FIG. 17;

FIG. 19 is a schematic view showing a further modification of FIG. 15;

FIG. 20 is a schematic view of the array of the photoelements of an image sensor which is directed to a color television camera of line sequential system according to the invention, the illustration being depicted in substantially the same manner as in FIG. 6;

FIGS. 21 and 22 are schematic views showing further modifications of FIG. 20;

FIG. 23 is a block diagram of a circuit for improving the interlaced scanning effect which is preferred for use with an image sensor having the array of photoelements as indicated in FIG. 22;

FIG. 24 is a schematic view, in substantially the same manner as in FIG. 5, of an additional array of photoelements of an image sensor constructed in accordance with the invention, the image sensor being used for the color television camera of line sequential system; and FIG. 25 is a block diagram of a processing circuit for the output signal from an image sensor having the array of photoelements as indicated in FIG. 24.

FIGS. 26-31 show different photoelement arangements and corresponding signal waveforms generated thereby.

Figure 1A:
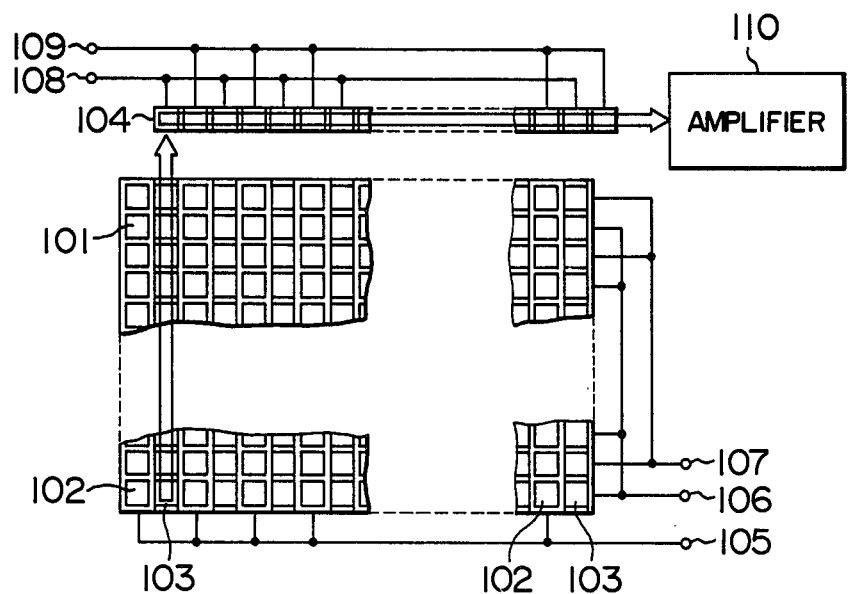
FIGS. 1a and 1b are block diagrams illustrating two examples of known image sensor.

Before proceeding with the detailed description of the invention, known image sensors will be described first with reference to FIG. 1 in order to permit a better understanding of the present invention. The image sensor shown in FIG. 1a is a model manufactured by Fairchild Camera and Instrument Corp., State of California, comprising columns 102 of a plurality of photoelements 101, which columns are alternately arranged with analog shift registers 103 for vertical transfer, the respective final stages of the vertical transfer registers 103 being connected with the respective stages of a horizontal output analog shift register 104. For the sake of convenience, the direction of transfer is indicated by arrows. An electric charge is stored in a depletion layer underlying a photoelement 101 in accordance with the intensity of an irradiating light, and is transferred into a vertical transfer register 103 when a signal from a terminal 105 is applied to an electrode thereof. In the present example, two phase clock pulses are applied to terminals 106 and 107, respectively, to cause a transfer of the charge in the vertical transfer registers 103, one row at a time, to the output register 104. The charge which is transferred to the output register 104 is read out in a horizontal direction by clock pulses applied to terminals 108 and 109, and is eventually fed into an output amplifier 110. The frequency of the horizontal transfer clock exceeds the product of the vertical transfer frequency and the number of the stages in the output registers 104.

Figure 1B:
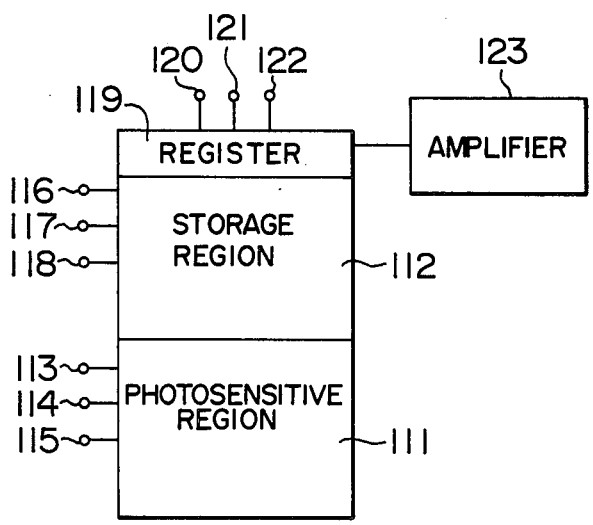

FIG. 1b shows another image sensor which is a model manufactured by RCA Corp. The image sensor is shown in greatly simplified form, and comprises a photosensitive region 111 having a common horizontally extending electrode, and a storage region 112 of a similar construction which is separated therefrom. The photoelements in the phososensitive region 111 is arranged in an array in a similar manner as mentioned above, except that the photoelements have a common horizontally extending electrode and that their charge is transferred through the respective depletion layers without being transferred to a transfer register. The charge generated in the photosensitive region 111 is transferred to the storage region 112 by means of clock pulses applied from terminals 113, 114 and 115, and the transferred charge in the storage region is carried to a horizontal output register 119 by means of clock pulses applied to terminals 116, 117, 118. Subsequently, clock pulses are applied to terminals 120, 121, 122 to read out in the horizontal direction to feed an output amplifier 123.

The basic operation of an image sensor including charge-coupled device or charge transfer device as exemplified by the above examples is as follows:

(1) Photon generated charge is stored in an array of depletion layers or potential barriers formed by MOS capacitors; and (2) A signal in the form of a packet of charge is transferred from each element of the array to a detector through a series of potential wells.

Figure 2:
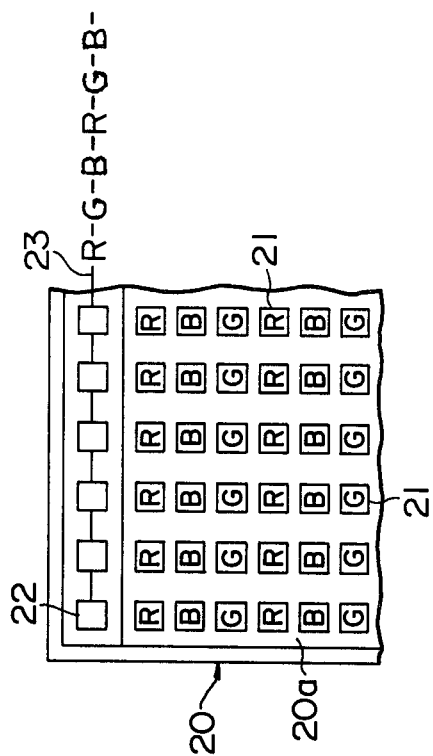
FIG 2 is a block diagram of a known television camera incorporating an image sensor.

FIG. 2 shows a block diagram of a television camera incorporating an image sensor. An image sensor 129 functions, in place of a conventional pickup tube, to receive an image through an optical system 124, and to feed its image information to a video amplifier 125. It will be noted that the image sensor 129 is supplied with a drive signal from a timing circuit 126. The output of the video amplifier 125 is fed to a processor 127 together with a blanking and sync signal supplied from the timing circuit 126. The output of the processor is supplied to a monitor 128.

In the following Figures are shown several embodiments of the color television camera according to the invention which, for the purpose of convenience, are illustrated as arranged according to the NTSC system. However, it will be appreciated by those skilled in the art that the invention is not limited to the NTSC system, but is equally applicable to the PAL or SECAM systems. In the description to follow and in the drawings, reference characters "R", "G" and "B" are used to denote "red", "green" and "blue", respectively. While these reference characters may sometimes represent the color itself and the corresponding color signal in other instances, a confusion therebetween could be avoided since they are distinctly referred to where needed. It should be understood that the denotation of R, G and B for the red, green and blue color is merely a convenience of description, and may represent other colors.

Figure 3:
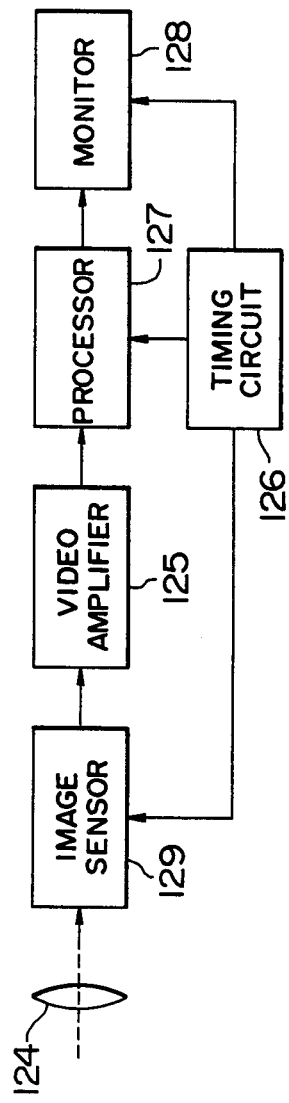
FIG. 3 is a schematic illustration, substantially in top view, of a dot sequential array of photoelements constituting an image sensor which is used for the color television camera according to the invention.

Referring to FIG. 3, there is shown one embodiment of the invention which is constructed as a color television camera of dot sequential type. In this Figure, only a portion of a photosensitive array 20a comprising a plurality of photoelements 21 distributed throughout an image sensor 20 is illustrated. In an actual image sensor, the photosensitive array 20a will alternate with vertical transfer registers if the image sensor 20 is constructed according to the principle illustrated in FIG. 1a, or the photosensitive array 20a will be connected with a storage array if the sensor is constructed according to the principle illustrated in FIG. 1b. However, in any event, an electric charge which is stored in a depletion layer underlying a photoelement 21 and having a magnitude in accordance with the intensity of an irradiating light is read out in a sequential manner, so that these associated elements are omitted from illustration except an output register 22 and its associated output line 23.

According to the invention, the photoelements 21 of the image sensor 20 is each made sensitive to light of a single color, even though the assembly of the photoelements is sensitive to light of more than one colors. The manner in which each photoelement 21 is given a color selectivity has been mentioned previously. In the embodiment shown in FIG. 3, the photoelements 21 of a single horizontal row are given a regular color selectivity in the sequence of R, G, B, R, G, B and so on, by the provision of dot filters, for example. As a consequence, the photoelements 21 of a single vertical column have the same color selectivity. The charges stored in the respective photoelements 21 are simultaneously transferred in the vertical direction by a single set of clock pulses, and the charges in the photoelements 21 of the final stage or row are transferred to the output registers 22, from which a read-out is made sequentially in the horizontal direction. In this manner, a dot sequential signal in the sequence of R, G, B, R, G, B is obtained from the output line 23 which can be separated into individual R, G and B color signals in an external circuit by using sampling pulses. The only requirement concerning the arrangement of colors among the photoelements 21 is that it maintains a fixed sequence. Any number of colors in excess of one may be used. It will be noted that the sequence of color selectivity of the respective photoelements 21 may be changed from horizontal row to horizontal row.

FIG. 4 schematically illustrates an image sensor for a color television camera of line sequential type, which is depicted in the similar manner as in FIG. 3. In the present example, the photoelements 21 in odd-numbered rows have the color selectivity in the sequence of R, G and B, while those in even-numbered rows have the color selectivity in the sequence of B, R and G. The transfer of charges takes place for each column by a set of clock pulses, but each column is associated with a pair of transfer channels, the charges stored in those photoelements 21 which are included in an odd-numbered row being transferred alone in an odd-numbered field and the charges stored in those photoelements 21 which are included in an even-numbered row being transferred in an even-numbered field. The provision of such a pair of transfer channels in association with a single photosensitive array is in itself known as disclosed in the IEEE intercon technical papers referred to above. The change from one transfer channel to the other for each successive field results in the same effect as achieved in a normal interlaced operation, allowing a line sequential signal in the sequence of R, G and B to be read out from the image sensor 20. The conversion of the R, G and B line sequential signals into a simultaneous signal is described, for example, in British Pat. No. 1,162,003.

In the NTSC system, the number of scanning lines is 525 and a 1:2 interlaced system is adopted. Assuming a vertical retrace period of 21H (H being one horizontal scanning period), the retrace time for a pair of odd- and even-numbered fields will be 42H, so that if the arrangement shown in FIG. 3 is applied, there must be 525−42=483 rows. It will be appreciated that the provision of about 500 rows will be more than sufficient to produce an interlaced signal.

FIG. 5 is a simplified illustration of the photoelements 21 shown in FIG. 4, an odd-numbered row being indicated by a solid line and an even-numbered row being indicated by a dotted line. For the convenience of description, the output registers are omitted from illustration, and instead the output line 23 is shown to indicate that the charges of the respective rows are read out in turn. Such a simplified illustration will facilitate an understanding of the interlaced operation. In this Figure, the reference character L followed by an Arabian number represents the number of a horizontal scanning line while the denotation No. represents the number of the row of the photoelements.

FIG. 6 shows a similar simplified illustration of FIG. 5 wherein each row of the photoelements is represented by a solid line. The number of the scanning line is indicated on the opposite sides of the solid line. As will be apparent, both odd- and even-numbered fields use the same photoelements in this example. As a consequence, there is no need to provide a pair of transfer channels as indicated in FIG. 4, but the charges for the respective columns may be transferred in sequence. As a result, a line sequential signal in the sequence of R, G and B is obtained from the output line 23. In the NTSC system, there may be provided 250 rows of photoelements for reduction to practice of the invention, but the lack of the interlaced scanning may result in a degradation of the vertical resolution. However, such a disadvantage can be compensated for by processing the output signal in an external circuit.

FIG. 7 shows a circuit for improving the interlaced scanning effect which is preferred for use with the image sensor shown in FIG. 6. An input terminal 28 is adapted to receive a line sequential signal in the sequence of R, G and B, and is connected with 1H delay circuits 29, 30 and 31 successively. A signal generator 32 for switching between an odd- and an even-numbered field is connected with a signal switching circuit 33 which is in turn connected with an adder 34. A ring counter 35 which produces one pulse for a 3H interval is connected with a signal gate circuit 36 which is provided with output terminals 37, 38 and 39 for continuous R, G and B signals, respectively. Describing initially the operation of the signal generator 32, switching circuit 33 and adder 34, it will be understood that the signal supplied from the terminal 28 to the switching circuit 33 is of the same color as the signal fed from the delay circuit 31, but there is a time delay of 3H therebetween. By an adjustment of the polarity of the pulse from the signal generator 32, the switching circuit 33 is made to select the signal fed from the terminal 28 for input to the adder 34 during an odd-numbered field and to select the signal supplied from the delay circuit 31 for input to the adder 34 during an even-numbered field. Thus, the output from the adder 34 is the signal on each scanning line in the direct form during an odd-numbered field, but is an average of signals on two adjacent lines of the same color (involving a time delay of 3H therebetween) during an even-numbered field. The combination of the delay circuits 29, 30, the ring counter 35 and the switching circuit 36 serves converting the line sequential signal of R, G and B into a simultaneous signal of R, G and B. Such conversion is known as disclosed in the previously cited British Patent and therefore will not be described in detail. By varying the number of rows of photoelements combined for the color corresponding to each scanning line during an odd- and an even-numbered field, there can be achieved an improvement in performance.

FIGS. 8 and 9 show modifications of the arrangements shown in FIGS. 5 and 6, respectively, illustrating techniques for deriving a two color line sequential signal from the output line 23. Such a technique is principally used to produce color signals with a color television camera which incorporates a pair of solid state image sensors.

FIG. 10 shows an image quality improving circuit which may be used with an image sensor outputting a two color, line sequential signal, as illustrated in FIG. 8 or 9. An input terminal 40 is adapted to receive a line sequential signal in the sequence of R1, B1, R2, B2 . . . Reference numeral 41 represents a 1H delay circuit as do reference numerals 44 and 45. A gate pulse generator 42 feeds a signal gate circuit 43 which in turn feeds a pair of adders 46 and 47 having associated output terminals 48, 49 for the R signal and B signal, respectively. The circuit portion comprising the elements 41, 42 and 43 constitutes a known conversion circuit for converting a line sequential signal to a simultaneous signal. The output of the gate circuit 43 is in the form a pair of simultaneous signals in the form of trains R1, R1, R2, R2, . . . and B1, B1, B2, B2 . . . Since each of the trains includes the same signal repeated twice, its passage through the circuit portion comprising the delay circuit 44 and the adder 48 produces an average of signals on two immediately adjacent scanning lines as an output, for example, producing an R signal in the form of R1, (R1+R2)/2, R2, (R2+R3)/2 and so on. In the former arrangement, the interval during which B1 is being scanned is supplemented by R1 which is delayed by 1H, but in the present system, the image quality is improved by supplying an interpolated component of (R1+R2)/2.

FIG. 11 shows an additional circuit which is added to the circuit of FIG. 10 when an image sensor such as illustrated in FIG. 9 is used in order to improve the interlaced scanning effect. The terminal 48 refers to the same output terminal for the R signal illustrated in FIG. 10. This terminal is connected with a 1H delay circuit 50, an adder 51 and a signal switching circuit 53 which is also fed from a pulse generator 52 which produces a pulse for switching between an odd- and an even-numbered field. Since the input signal at the terminal 48 is a consecutive train of R signals in the form of R1, (R1+R2)/2, R2, (R2+R3)/2 . . . , the output after passing through the delay circuit 50 and the adder 51 will be in the form of (3R1+R2)/4, (R1+3R2)/4, (3R2+R3)/4 . . . which are delayed by 1H. By operating the signal switching circuit to pass the output at the terminal 48 directly to an output terminal 54 during an odd-numbered field and to pass the output from the adder 51 to the output terminal 54 during an even-numbered field, an improved interlaced scanning is achieved.

While the arrangements of FIGS. 10 and 11 have been described in terms of a line sequential signal, the similar arrangement can be applied to a dot sequential signal. In this instance, it will be obvious to one skilled in the art that the desired result can be obtained by changing the time delay and the frequency of the switching pulse. The circuit shown in FIG. 11 is directly applicable to the brightness signal, and even though the brightness signal is not subjected to a normal interlaced scanning as exemplified by FIG. 6, the output signal will be still improved in respect of the interlaced scanning.

FIG. 12 shows one embodiment of dot sequential type in which the transfer of charges takes place by two sets of clock pulses. The photoelements in each row have a color selectivity to two colors in the sequence of R, B, R, B, thus dividing the entire assembly into R group and B group, each of which is subjected to a transfer of charge in a set by separate clock pulses. The R group is transferred to the output register 22, while the B group is transferred to an output register 24, and the R and B signals are simultaneously obtained from the respective output lines 23, 25. The combination of colors may be in any number of colors in excess of two, and the sequence may be changed from row to row provided the arrangement maintains a given rule. It is necessary to pass the signals to an external circuit where they are separated into necessary color signals by using a sampling pulse. While not shown, a modification is contemplated in which three sets of clock pulses are used for a dot sequential system.

Figure 26:
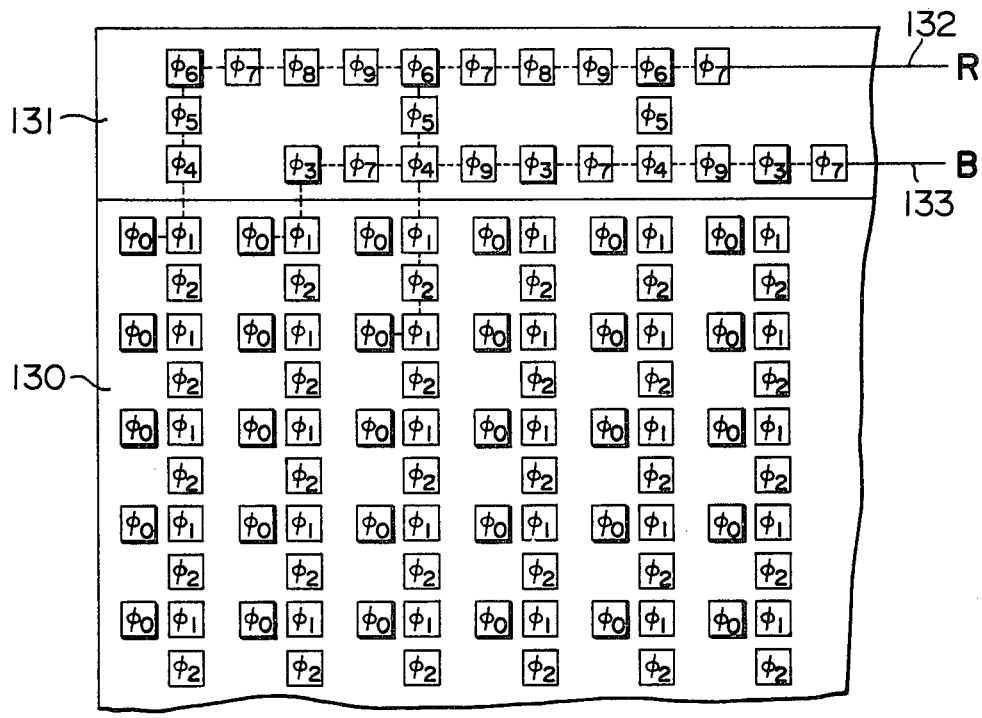

FIG. 26 shows an arrangement which results from the application of the principle illustrated in FIG. 12 to an image sensor of the type shown in FIG. 1a. The image sensor comprises a light sensing section 130 and an output register sector 131. Elements with a shading and designated by reference character $\phi_0$ represent photoelements which are sensitive to light while elements $\phi_1$ to $\phi_9$ are charge transfer registers which are insensitive to light by being physically shielded from the incidence of light. It is assumed that the photoelements $\phi_0$ in the individual rows have a color sensitivity to two colors in the sequence of R, B, R, B as illustrated in FIG. 12. All of the elements $\phi_0$ to $\phi_9$ comprise charge transfer elements which are driven by a two phase clock to effect charge transfer in selected directions, namely, to the right and in the upward direction.

Figure 27:
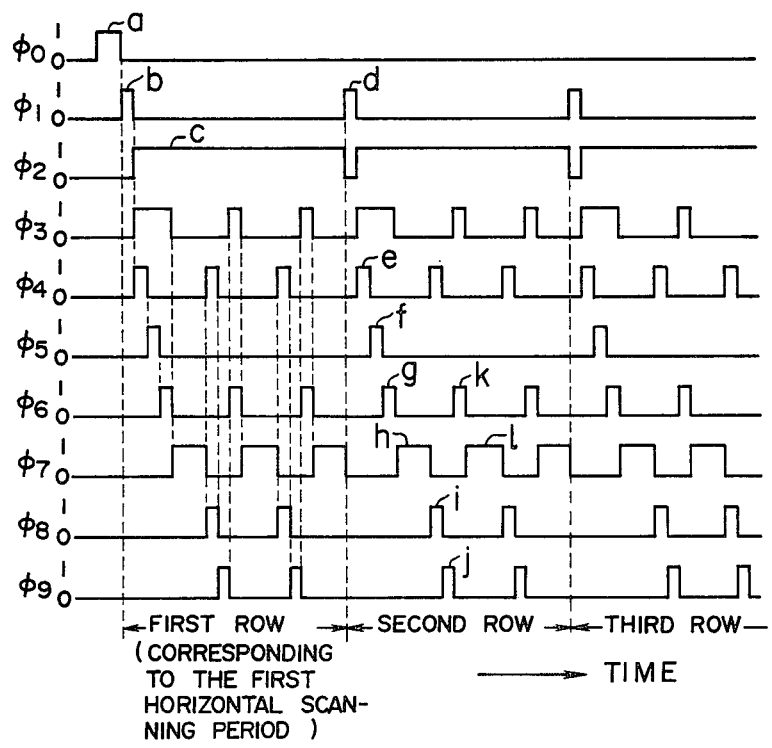

FIG. 27 shows clock pulse trains applied to the gate electrode of the respective elements $\phi_0$ to $\phi_9$. The designations $\phi_0$ to $\phi_9$ appearing to the left of each pulse train indicate that the corresponding pulse train is applied to the gate of all of those elements shown in FIG. 26 which are designated by one of them. Thus, the elements designated by a particular reference character have their gate electrodes interconnected by a lead wire, which is insulated from other lead wires interconnecting other elements. In this manner, a charge stored in a photoelement located at the upper left-hand corner or on row 1 and column 1 will be transferred to R output line 132 by gate voltages on a sequence of elements $\phi_0$-$\phi_1$-$\phi_4$-$\phi_5$-$\phi_6$-$\phi_7$-$\phi_8$-$\phi_9$-$\phi_6$-$\phi_7$-$\phi_8$-$\phi_9$-$\phi_6$-$\phi_7$ which successively charge from 0 to 1 level. Similarly, a charge stored in a photoelement $\phi_0$ located at the crossing of row 1 and column 2 will be transferred to B output line 133 by gate voltages on a sequence of elements $\phi_0$-$\phi_1$-$\phi_3$-$\phi_7$-$\phi_4$-$\phi_9$-$\phi_3$-$\phi_7$-$\phi_4$-$\phi_9$-$\phi_3$-$\phi_7$ which successively charge from 0 to 1 level.

Such charge transfer will be more specifically described for the charge stored in an R photoelement $\phi_0$ located on row 2 and column 3 which is read out onto the output line 132 as a second signal during a second line period. The photoelements $\phi_0$ shown in FIG. 26 all store an electric charge which corresponds to incident light in response to a pulse a shown in FIG. 27. The charge stored in the particular photoelement $\phi_0$ located on row 2 and column 3 is transferred to the element $\phi_1$ located immediately adjacent thereto in response to a pulse b, and then transferred to the element $\phi_2$ located immediately above $\phi_1$ in response to a pulse c. The charge is retained there during the line period, and is transferred in the upward direction to the element $\phi_1$ thereabove in response to a pulse d at the commencement of the next line period. Subsequently the pulse e cause a charge transfer to the element $\phi_4$ in the output register section 131, and the next following pulse f causes a charge transfer to the element $\phi_5$ located above the last mentioned element $\phi_4$. At this time, a transfer to the rightwards adjacent element $\phi_9$ cannot occur since the gate voltage thereof is zero. Subsequent pulse g causes the charge to be transferred to the element $\phi_6$. It is to be understood that the charge stored in all other elements located on row 2 which have the R color sensitivity is similarly transferred to corresponding elements $\phi_6$ in response to the pulse g. The charge from the particular element (located on row 2 and column 3) is then sequentially transferred to the right by pulses h, i, j, k, and l until it is derived on the R output line 132 during the period of the pulse l which corresponds to a second signal during a second line period. In this manner, a charge stored in a photoelement at a given location is read out to the associated output line during a given period.

Figure 28:
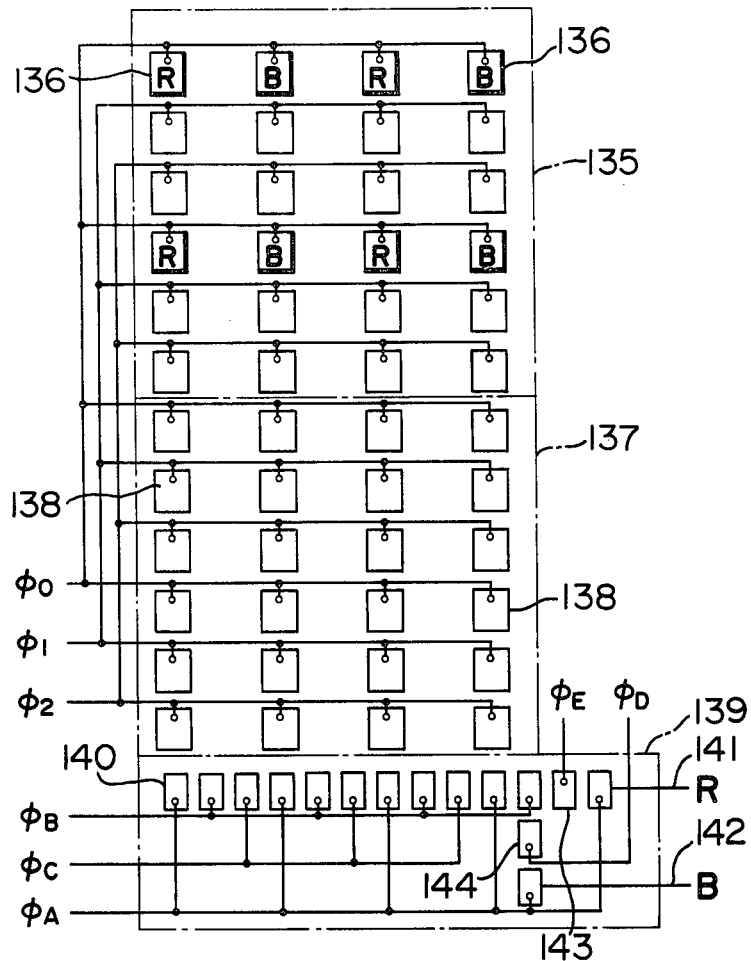
Figure 29:
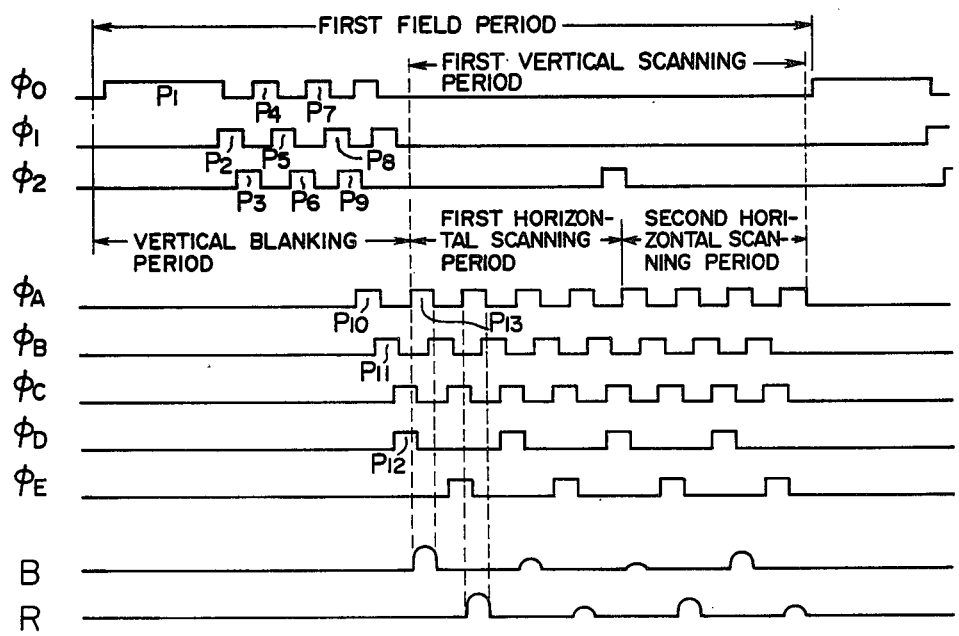

FIG. 28 shows an arrangement which obtains when the principle illustrated in FIG. 12 is applied to an image sensor of the type shown in FIG. 1b. FIG. 29 shows the clock pulses supplied to the image sensor of FIG. 28. The image sensor shown has effective picture elements arranged in two rows and four columns and from which charge is transferred by three phase clock pulses. It comprises a light sensitive region 135 having photoelements 136, a storage region 137 having elements 138 and an output register section 139 having elements 140. The photoelements 136 in the light sensitive region 135 and the elements 138 in the storage region 137 are coupled in the vertical direction while the elements 140 in the output register 139 are coupled in both horizontal and vertical directions. In the example shown, the light sensitive region 135 includes twenty-four photoelements 136, but the charge transfer to the storage section 137 takes place by utilizing the three phase clock pulse trains $\phi_0$, $\phi_1$ and $\phi_2$ shown in FIG. 29, so that the photoelements which are available as effective picture elements during one vertical scan period are only those eight photoelements, which are indicated by shading and designated by reference characters R and B. With the image sensor of this type, the exposure period and the transfer-to-storage period usually run during the vertical retrace period. The photoelements sensitive to R and B light components store an electric charge in accordance with an incident light for the duration of pulse $P_1$, and the charge is rapidly transferred to the storage section 137 by pulses $P_1$ to $P_9$ within the vertical retrace period so that the charge pattern on the light sensitive region 135 is entirely transferred to the storage section 137. Pulse $P_{10}$ which occurs in succession to pulse $P_9$ is effective to transfer the charge on the first row to the output register 139, and the pulse trains $\phi_A$, $\phi_B$ and $\phi_C$ then become effective to produce a transfer to the right. However, before the charge reaches an R output line 141 and a B output line 142, the charge is selected by an R output select element 143 and a B output select element 144 which have clock pulses $\phi_E$ and $\phi_D$ applied to their gate electrodes, thus conducting a desired R or B signal to the associated output line. Specifically, the charge from the B photoelement which is to be outputted in the first place is transferred by pulse $P_{10}$ to an element which is the second from each select element, and then transferred by pulse $P_{11}$ to an element immediately adjacent to the select element. The next pulse $P_{12}$ appears as $\phi_D$ and no pulse is present on $\phi_E$ at this time, and hence the charge is transferred toward the B output line 142. The following pulse $P_{13}$ on $\phi_A$ outputs it onto the B output line 142. In this manner, the clock pulse trains illustrated in FIG. 29 are effective to derive four R and B signals on the respective output lines during the first and second line periods.

Though several embodiments of a television camera have been specifically described which simultaneously derive the pair of R and B signals from an image sensor of dot sequential type comprising rows of photoelements each arranged so as to have the color sensitivity in the sequence of R, B, R, B with the use of two sets of clock pulses, it should be understood that the arrangements shown in FIGS. 26 to 29 are merely illustrative, and not limitative of the invention. In particular, the combination of clock pulses shown in FIGS. 27 and 29 and the interval therebetween are readily subject to modification. The phase relationship between the R and B output signals can also be changed by varying the number and disposition of elements in the image sensor as well as the timing of the clock pulses supplied thereto. Also, it would be readily possible for one skilled in the art to modify the described image sensor of dot sequential type to provide more than two output signals. Furthermore, the described principle of the image sensor can be equally applied to an image sensor of line sequential type in which the color sensitivity of the photoelements changes from row to row in order to provide a television camera which simultaneously derives a plurality of color signals.

Figure 30:
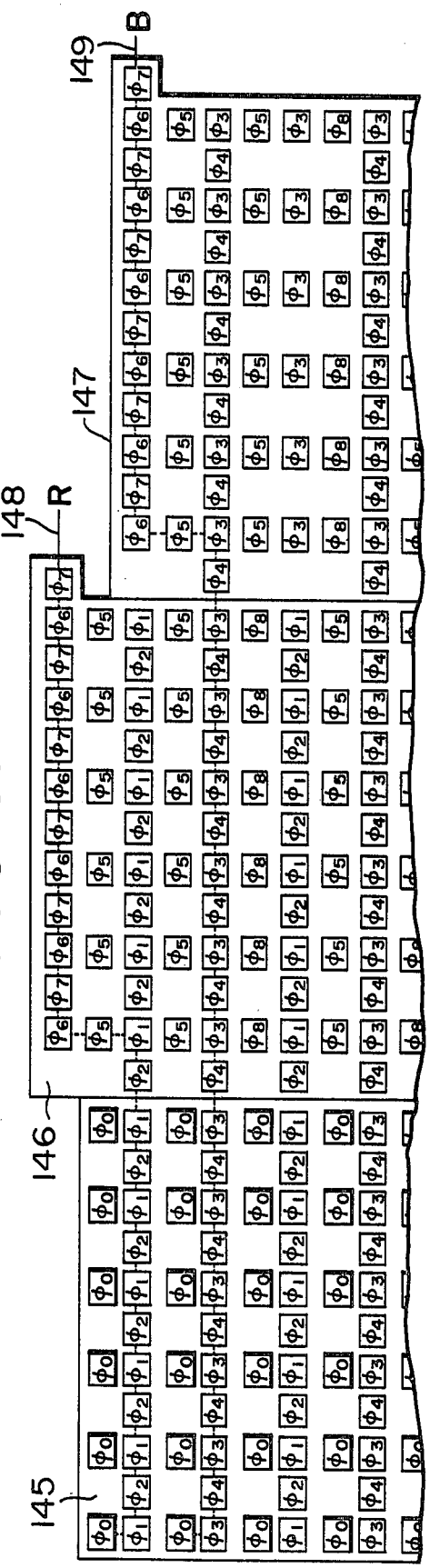
Figure 31:
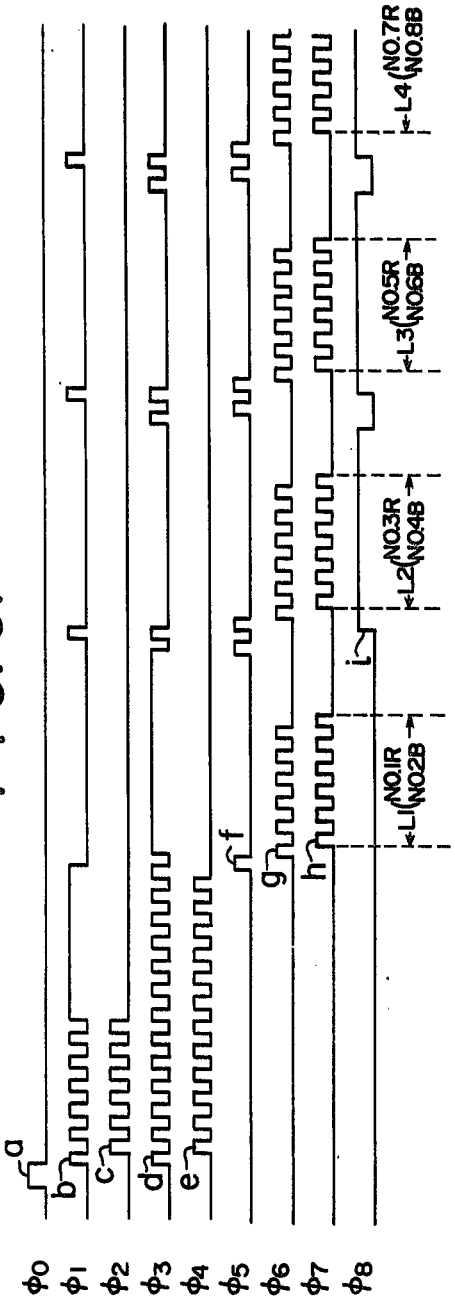

Such an image sensor of line sequential type will be described with reference to FIGS. 30 and 31. FIG. 30 shows an arrangement for deriving R and B output signals from an image sensor in which the photoelements in an odd-numbered row have the red color selectivity and those in an even-numbered row have the blue color sensitivity. The image sensor comprises a light sensitive region 145, and a first and a second output register section 146, 147. It should be noted that those elements $\phi_0$ with a shading represent photoelements having a sensitivity to light in the manner mentioned above while other elements $\phi_1$ to $\phi_8$ represent transfer registers. FIG. 31 shows clock pulses which are applied to the gate electrodes of the individual elements $\phi_0$ to $\phi_8$. An electric charge is stored in individual photoelements $\phi_0$ in accordance with the incidence of light thereto during the period of pulse a. For purpose of illustration, paths which the charge transfer follows from the photoelements located on row 1, colums 1 and on row 2, column 1 until respective output lines 148, 149 are reached are indicated by phantom lines which join adjacent elements on the respective paths. Specifically, the charge stored in the R photoelements $\phi_0$ on row 1 is transferred by pulse b to the elements $\phi_1$ located directly below them, and is then transferred to the elements $\phi_2$ located adjacent to the $\phi_1$ on the right-hand side thereof upon application of pulse c to the elements $\phi_2$. The subsequent repetition of the pulses b and c in alternate fashion is effective to transfer the charge from the R photoelements $\phi_0$ of row 1 to the right until it is received into the corresponding elements $\phi_1$ in the first output register section 146 where it is temporarily stored.

In the similar manner, the charge stored in the B photoelements $\phi_0$ on row 2 is transferred at the same time as the charge transfer in row 1 is initiated. Specifically, the charge in the photoelements $\phi_0$ on row 2 is transferred by pulse d to the elements $\phi_3$ located directly below them. Subsequent repetition of pulses e and d in alternate fashion effects a charge transfer to the right until it is received into the corresponding elements $\phi_3$ in the first output register section 146. This occurs simultaneously as the charge from the row 1 is received into the elements $\phi_1$ of the section 146. While the charge transferred to the elements $\phi_1$ of the section 146 is left in a standby mode as mentioned above, the continued occurrence of the pulses d and e causes the charge from row 2 to be transferred further to the right until it is received into the corresponding elements $\phi_3$ in the second output register section 147.

When pulse f occurs subsequently, the charge from row 1 which has been temporarily retained in the elements $\phi_1$ of the first output register section 146 and the charge from row 2 stored in the elements $\phi_3$ of the second output register section 147 are simultaneously transferred to corresponding elements $\phi_5$ which are located directly above the respective elements $\phi_1$ and $\phi_3$. Upon occurrence of pulse g, the respective charges are again transferred upwardly into corresponding elements $\phi_6$. Subsequently, pulses h and g occur alternately to transfer the respective charges through a series of alternate $\phi_7$ and $\phi_6$ elements, thus eventually deriving R and B output signals on the respective output lines 148 and 149.

The charge stored in the photoelements $\phi_0$ on rows 3 and 4 is similarly read out. In this instance, however, after the charge from row 3 or 4 is received into the output register section 146 or 147, pulse i transfers the charge upwardly into the corresponding elements $\phi_8$. Thus, R and B output signals from row 1 and row 2 are derived during the first line period, R and B signals from row 3 and row 4 are derived during the second line period, and so on.

As mentioned above in connection with the arrangements shown in FIGS. 26 and 28, a variety of modifications are possible in the arrangement of FIG. 30. In particular, the image sensor of FIG. 30 may be modified to provide more than two color signals simultaneously. For these reasons, the image sensor of FIG. 30 will be represented in schematic form as shown in FIG. 14 to describe various modifications thereof, it being understood that the description of the basic arrangement will not be repeated.

FIGS. 13 to 19 illustrate various schemes for simultaneously obtaining a pair of line sequential signals by using two sets of clock pulses. In FIG. 13, an odd-numbered row is allotted R and an even-numbered row is allotted B. The first and second rows correspond to a first scanning line, the fifth and sixth rows correspond to a second scanning line, the third and fourth rows correspond to a 264-th scanning line, and the seventh and eighth rows correspond to 265-th scanning line. The photoelements allotted with R sensitivity is assembled into one group, while the photoelements allotted with B selectivity is assembled together as another group. Two sets of clock pulses are used to effect a transfer of the charges, whereby a simultaneous signal comprising R and B which is subjected to a normal interlaced scanning is obtained from the output lines 23, 25. In this instance, about 1000 rows of photoelements will be required for the NTSC system.

FIG. 14 shows another scheme for simultaneously obtaining a pair of color signals by the use of two sets of clock pulses in the similar manner as in FIG. 13. In this instance, however, the same rows are used during an odd- and an even-numbered field. As a consequence, the number of photoelements required may be reduced to one-half that required in the arrangement of FIG. 13.

In FIG. 15, the respective rows are given the selectivity in the sequence of R, G, B, R, G, B . . . and the transfer of charge takes place simultaneously for a pair of rows so that the first and second rows correspond to a first scanning line, the third and fourth rows correspond to a second scanning line, while the first and second rows correspond to 264-th scanning line during an even-numbered field, thereby using the same photoelements during an odd- and an even-numbered field. Since two sets of clock pulses are used to effect the transfer of charge, the first train comprises a line sequential signal in the sequence of R, B, G, R . . . and the second train comprises a line sequential signal in the sequence of G, R, B, G . . . A simultaneous three color signal can be obtained from these signals of the two trains in the manner illustrated in FIG. 16. A pair of input terminals 61 and 62 feeds a signal gate circuit 64, and the input terminal 62 also feeds a 1H delay circuit 63 which in turn feeds a delayed output to the signal gate circuit. A gate pulse generator 65 feeds the gate circuit 64. When the signals in the first and second trains applied to the terminals 61 and 62 are G and B signals, respectively, the output of the delay circuit 63 will be R signal, whereby three color signals are simultaneously supplied into the gate circuit 64 to cause a cyclic change in color at an interval of 1H, thereby deriving a simultaneous signal comprising consecutive R, G and B signals at its output terminals 66, 67 and 68.

FIG. 17 illustrates an improvement interlaced scanning over the arrangement shown in FIG. 15. The solid state image sensor may be the same as that shown in FIG. 15. Thus, it is assumed that the first row is allotted the selectivity of R, the second row that of G and the third row that of B, and that this pattern is repeated in the sequence of R, G and B for the remainder of the entire rows which comprise 500 rows. Odd-numbered rows are assembled together into one group, while even-numbered rows are assembled together into another group. The transfer of charge takes place by two sets of clock pulses, but during an odd-numbered field, the transfer takes place simultaneously for the both groups. Thus, R and G signals are produced by the first and second rows corresponding to the first horizontal scanning line, and B and R signals are produced by the third and fourth rows corresponding to the second horizontal scanning line. An even-numbered field begins with the later half of 263-th scanning line, but the description will be given beginning with 264-th scanning line, since the one-half period has no particular significance with the subject matter here in question. During an even-numbered field, the clock pulse which is associated with the group comprising odd-numbered rows is caused to start by 1H period earlier than the clock pulse associated with the group comprising even-numbered rows so that the transfer from the first row starts with the beginning of 263-th horizontal scanning line and the transfer from the second row starts with the beginning of 264-th horizontal scanning line. Such an adjustment of the clock pulse can be readily achieved by an external circuit. As a consequence, during an even-numbered field, the second and third rows correspond to 264-th scanning line, producing G and B signals. This is followed by 265-th scanning line corresponding to the fourth and fifth rows, producing R and G signals. This sequence is repeated until the transfer of an even-numbered field is completed. During the following odd-numbered field, the transfer again occurs simultaneously from the first and second rows. With this arrangement, the combination of rows which constitute the horizontal scanning lines during an odd- and an even-numbered field is staggered from each other, achieving the same effect as in a normal interlaced scanning. However, inconveniences are caused when the signals from these two trains are applied to the circuit of 16, and it is necessary to pass these signals through an additional circuit as illustrated in FIG. 18, which shows an example of the signal switching circuit for the output signal from the image sensor shown in FIG. 17. In FIG. 18, reference numerals 61 to 68 represent same elements as in FIG. 16, but an odd- and even-numbered field switching circuit 69 is arranged to precede terminals 61, 62, and is driven by a switching pulse generator 70. The switching circuit 69 operates to output the input signals from terminals 71, 72 to the terminals 61, 62, respectively, during an odd-numbered field, and to output these input signals to the terminals 62, 61, respectively, during an even-numbered field. Since the input to the switching circuit is in a cyclic sequence of three colors R, G and B, three consecutive color signals can be simultaneously derived at the terminals 66, 67 and 68.

FIG. 19 shows a modification of FIG. 15. Specifically, the allotment of the colors to the rows is changed, the even-numbered rows having alternate selectivity of R and B while the odd-numbered rows all have the same selectivity of G. As a consequence, the output signal from the odd-numbered rows is G signal consecutively, while the output signal from the even-numbered rows is a line sequential signal comprising R and B signals. It is well known to derive a simultaneous signal from a line sequential signal of R and B, using 1H delay circuit.

FIG. 20 shows an arrangement in which three sets of clock pulses are used to perform a transfer of charge, thus deriving three trains of signals from the output lines 23, 25 and 26 simultaneously. This corresponds to the arrangement shown in FIG. 14 in which two trains are obtained. During both the odd- and even-numbered fields, the same photoelements are used to provide a simultaneous signal comprising R, G and B. While not shown, an arrangement corresponding to FIG. 13 involving two trains may be provided to improve the interlaced scanning effect.

FIG. 21 shows an arrangement which is designed to provide an improved interlaced image using an array of photoelements including about 750 rows. As in FIG. 17 where two trains are involved, the combination of rows corresponding to the respective scanning lines is changed during an odd- and an even-numbered field. In the arrangement shown, during an odd-numbered field, the first, second and third rows correspond to a first scanning line, the fourth, fifth and sixth rows correspond to a second scanning line and so on. During an even-numbered field, the third, fourth and fifth rows correspond to 264-th scanning line, the sixth, seventh and eighth rows correspond to 265-th scanning line and so on. For the transfer of charge, the timing of starting the clock pulses is adjusted. At this end, during an even-numbered field, an adjustment is made in an external circuit so that the clock pulses used to derive R signal in the first train and G signal in the second train be started by 1H interval earlier than that used to derive B signal in the third train.

While not shown, during an even-numbered field, the clock pulse associated with R signal in the first train may be started by 1H interval earlier so that the second, third and fourth rows correspond to a 264-th scanning line.

FIG. 22 shows an arrangement for an improved interlaced effect in which the image sensor and the transfer of charge remains completely same as the arrangement shown in FIG. 21, but an adjustment is made in an external circuit so that only during an even-numbered field, G signal contained in the scanning line which occurs 1H interval earlier is utilized to be passed through 1H delay circuit, thereby causing the signals from four rows to correspond to a single scanning line. In this Figure, the second, third, fourth and fifth rows correspond to a 264-th scanning line, and the fifth, sixth, seventh and eighth rows correspond to a 265-th scanning line. With this arrangement, a scanning line of an even-numbered field is interposed between the scanning lines of an odd-numbered field, thereby producing an improved interlaced effect.

FIG. 23 shows a circuit which is designed for the arrangement of FIG. 22. In this Figure, an input terminal 73 feeds a signal switching circuit 77 through a buffer amplifier 74 on one hand and through a 1H delay circuit 75 and another buffer amplifier 76 on the other hand. The switching circuit is driven by a generator 78 which produces a switching pulse for switching between an odd- and an even-numbered field, and is switched so that the signal from the amplifier 74 is applied to an adder 79 during an odd-numbered field while the signal from the amplifier 76 is applied to the adder 79 during an even-numberd field. When G signal in the second train shown in FIG. 22 is applied to the terminal 73, the signal from the terminal 73 and the signal from the amplifier 74 are summed together in the adder 79 during an odd-numbered field, so that the G signal from the second and fifth rows which are originally same is outputted 80. However, during an even-numbered field, the signal from the terminal 73 and the signal from the amplifier 76 is summed together in the adder 79, so that G signals from two immediately adjacent lines are added together. In this instance, the amplifier 76 may be made to have a narrow bandwidth (low pass response) so as to prevent a degradation in resolution which might occur by the addition of G signals from two adjacent lines. It will be noted that the circuit shown is substantially similar to that illustrated in FIG. 11.

In FIG. 24, the combination of rows during an odd- and an even-numbered field is changed to improve the interlaced scanning effect through the use of four sets of clock pulses. The respective rows are allotted the color selectivity in a repeated pattern of R, G, B and G. R, G, B and G signals are simultaneously obtained from the respective output lines 23, 25, 26 and 27. During an odd-numbered field, the transfer takes place for four rows such as the first, second, third and fourth rows, but the G signal in every fourth row such as the fourth, eighth, 12-th . . . rows are not used. R, G and B signals from the first, second and third rows correspond to a first scanning line, and R, G and B signals from the fifth, sixth and seventh rows correspond to a second scanning line. By contrast, during an even-numbered field, the transfer by a first set of clock pulses is caused to start by 1H interval earlier than the remainder. Thus, during subsequent interval, the transfer takes place for each group of four rows such as the second, third, fourth and fifth rows, but the G signal in the second train such as the second, sixth and 10-th rows is not used during an even-numbered field. Thus, B, G and R signals from the third, fourth and fifth rows correspond to a 264-th scanning line, and B, G and R signals from the seventh, eighth and ninth rows correspond to a 265-th scanning line. The switching pulse generator and the signal switching circuit can be arranged so that the G signal in the second train be used only during an odd-numbered field and the G signal in the fourth train be used only during an even-numbered field.

FIG. 25 shows a signal processing circuit for reduction to practice of the arrangement shown in FIG. 24. The G signal in the second train and the G signal in the fourth train are applied to a pair of terminals 81, 82 respectively. A signal switching circuit 83 which passes only the signals of an odd-numbered field is connected with the terminal 81, and another signal switching circuit 84 which passes only the signals of an even-numbered field is connected with the terminal 82. A switching pulse generator 85 is connected with the both signal switching circuits 83, 84, and an adder 86 combined two selected signals together, thereby producing a consecutive G signal at its output terminal 87.

While the invention has been shown and described in connection with several embodiments thereof, it should be understood that the disclosure given herein is illustrative only, but not limitative of the scope of the invention. It will be appreciated that in the television system employing 1:2 interlaced scanning scheme, an odd-numbered field ends at a ½H point where an even-numbered field starts, so that the image sensor may include a corresponding arrangement of photoelements. However, such an arrangement has no direct bearing with the essential teaching of the invention and therefore is not described. It will be appreciated that an extra number of rows may be provided and disposed of by a blanking signal.

In this manner, the invention provides a color television camera which is very compact and light weight and still reliable in operation. It is contemplated that the apparatus according to the invention may be integrally combined with an image recorder so as to form a portable camera.

Having described the invention, what is claimed is:

1. A color television camera, comprising:
an image sensor comprising an array of photosensitive photoelements arranged in a matrix and each responsive to only one particular color component and said array including photoelements responsive to different color components, wherein ones of said photoelements responsive to the same particular color component are arranged in groups within the matrix, and wherein an optical image focused in use on said array of photoelements induces in respective ones of said photoelements a respective stored quantity of charge representative of an intensity of the particular color components of the optical image at the position of each of the respective photoelements,
means for simultaneously receiving quantities of charge from each group of photoelements responsive to a particular color,
means for ordering quantities of charge from each group responsive to a same particular color component to simultaneously develop sequences of quantities of charge each representative of a different color component of the optical image, and
means for providing the sequences of quantities of charge as output signal sequences each representative of a different color component of the optical image.

2. A color television camera according to claim 1, wherein said means for simultaneously receiving quantities of charge comprises:
an array of shift register, responsive to enabling pulses for receiving quantities of charge from said photoelements and for transferring quantities of charge therebetween, and wherein said means for ordering comprises a plurality of shift registers defining paths for transferring quantities of charge from the respective groups of photoelements to develop said signal sequences representative of different color components.

3. In an array of photosensitive photoelements arranged in a matrix of rows and columns wherein each of the photoelements within a particular column is responsive to only one particular color component and wherein the photoelements within different columns are responsive to different color components, means for reading out the photoelements comprising:
means for simultaneously reading out from each of the columns of photoelements a sequence of quantities of charge representative of the intensity of the particular color components corresponding to the respective rows in the directions of said rows,
means for ordering the sequences of charge quantities from the respective rows into major sequences each of which is comprised of charge quantities representative of a different color and wherein the charge quantities within each major sequence occur in the order in which they occurred within each row of photosensitive photoelements within the matrix and in the order of the rows of the matrix.

4. In an array of photoelements according to claim 3, wherein said means for ordering comprises:
a plurality of register sequences each corresponding to a respective one of the major sequences of charge quantities,
means for loading into each register sequence a sequence of charge carriers corresponding to a particular color from a row of photoelements,
means for simultaneously reading out from the register sequences the sequences of charge carriers therein for reading out the major sequences of charge carriers as output signals, and
means for loading into each register sequence a sequence of charge carriers corresponding to a particular color from a next row of photoelements.

* * * * *